United States Patent
Valdes et al.

(10) Patent No.: US 9,656,752 B2
(45) Date of Patent: May 23, 2017

(54) SELF-ALIGNING SAFETY BELT

(71) Applicant: Zodiac Seats US LLC, Gainsville, TX (US)

(72) Inventors: Armando Valdes, Krum, TX (US); Aamir Jafri, Little Elm, TX (US); Robert W. Trimble, Gainesville, TX (US)

(73) Assignee: Zodiac Seats US LLC, Gainesville, TX (US)

( * ) Notice: Subject to any disclaimer, the term of this patent is extended or adjusted under 35 U.S.C. 154(b) by 0 days.

(21) Appl. No.: 14/899,696

(22) PCT Filed: Jun. 23, 2014

(86) PCT No.: PCT/US2014/043679
§ 371 (c)(1),
(2) Date: Dec. 18, 2015

(87) PCT Pub. No.: WO2014/205443
PCT Pub. Date: Dec. 24, 2014

(65) Prior Publication Data
US 2016/0137302 A1   May 19, 2016

Related U.S. Application Data

(60) Provisional application No. 61/837,709, filed on Jun. 21, 2013.

(51) Int. Cl.
  B60R 22/00   (2006.01)
  B64D 11/06   (2006.01)
  B60R 22/26   (2006.01)
(52) U.S. Cl.
  CPC ............ B64D 11/062 (2014.12); B60R 22/26 (2013.01)

(58) Field of Classification Search
  CPC .............................. B60R 22/26; B64D 11/062
  (Continued)

(56) References Cited

U.S. PATENT DOCUMENTS 3,727,977 A * 4/1973 Gmeiner ................. B60R 22/26
                                                          297/473 X
3,845,987 A * 11/1974 Bashford ................ B60R 22/26
                                                          297/468 X
(Continued)

FOREIGN PATENT DOCUMENTS

DE            8534017 U1    1/1986
DE           10135856 A1    2/2003
(Continued)

OTHER PUBLICATIONS

International Patent Application No. PCT/US2014/043679, Search Report and Written Opinion dated Oct. 30, 2014.

*Primary Examiner* — Rodney B White
(74) *Attorney, Agent, or Firm* — Kilpatrick Townsend & Stockton LLP; Dean W. Russell; Matthew T. Kitces

(57) ABSTRACT

A safety belt (104) is secured to a seat structure (102) using movable anchor points (114, 116, 406). In an embodiment, a y-belt (104) is attached to left and right pivotable anchor plates (110). The anchor plates (110) pivot when a load is applied to the safety belt (104), thus allowing the anchor points to self-align to maintain an equal amount of tension across the lower and higher portion of the seat belt. In a different embodiment, a 2-point safety belt (708) is attached to slidable anchors (406) that move within channels (404) in response to load applied to the safety belt, allowing the anchor points to self-align to maintain proper tension and positioning of the safety belt (708).

18 Claims, 7 Drawing Sheets

(58) Field of Classification Search
USPC .................................................. 297/468, 473
See application file for complete search history.

(56) References Cited

U.S. PATENT DOCUMENTS

| | | | | |
|---|---|---|---|---|
| 4,482,188 A | | 11/1984 | Tilly et al. | |
| 4,729,602 A | * | 3/1988 | Tokugawa | B60R 22/26 297/468 |
| 4,790,597 A | * | 12/1988 | Bauer | B60R 22/26 297/473 X |
| 4,923,214 A | * | 5/1990 | Siegrist | B60R 22/26 297/473 X |
| 5,219,206 A | * | 6/1993 | Anthony | B60R 22/26 297/473 X |
| 5,219,207 A | * | 6/1993 | Anthony | B60R 22/26 297/473 X |
| 5,303,983 A | * | 4/1994 | Gauger | B60N 2/067 297/473 X |
| 5,366,269 A | * | 11/1994 | Beauvais | B60N 2/4214 297/473 X |
| 5,924,772 A | * | 7/1999 | Pleyer | B60R 22/20 297/468 X |
| 6,116,689 A | * | 9/2000 | Bauer | B60N 2/1615 297/473 X |
| 6,467,849 B1 | * | 10/2002 | Deptolla | B60R 22/26 297/473 X |
| 7,516,987 B2 | * | 4/2009 | Koide | B60R 22/1951 297/473 X |
| 7,722,081 B2 | * | 5/2010 | Van Druff | B60R 22/30 297/468 X |
| 7,967,339 B2 | * | 6/2011 | Usoro | B60R 22/03 180/268 |
| 8,109,568 B2 | * | 2/2012 | Masutani | B60N 2/4221 297/473 X |
| 8,573,691 B2 | * | 11/2013 | Masutani | B60N 2/4221 297/216.1 |
| 8,864,172 B2 | * | 10/2014 | Yilma | B60R 22/20 180/268 |
| 2005/0134099 A1 | * | 6/2005 | Masutani | B60R 22/26 297/468 X |
| 2007/0126277 A1 | * | 6/2007 | Musale | B60N 2/1615 297/473 X |
| 2009/0284067 A1 | * | 11/2009 | Kling | B60R 22/20 297/473 |
| 2015/0158590 A1 | * | 6/2015 | Gehret | B64D 11/062 297/468 X |
| 2016/0039387 A1 | * | 2/2016 | Taubert | B64D 11/06 297/473 X |

FOREIGN PATENT DOCUMENTS

| | | |
|---|---|---|
| EP | 1607286 A1 | 12/2005 |
| FR | 2851974 A1 | 9/2004 |
| FR | 2890622 A1 | 3/2007 |

* cited by examiner

SELF-ALIGNING SAFETY BELT

CROSS REFERENCE TO RELATED APPLICATIONS

The present application is the U.S. national phase entry of International patent Application Ser. No. PCT/US 2014/043679 filed on Jun. 23, 2014, which application claims the benefit of U.S. Provisional Application Ser. No. 61/837,709 titled "Self-Aligning Y-Belt" filed on Jun. 21, 2013, each of which are hereby incorporated by reference in their entireties.

TECHNICAL FIELD

The present disclosure relates to passenger seats generally, such as aircraft seats, and more specifically to passenger seat restraints.

BACKGROUND

Restraints are used in passenger seats to protect a passenger from injury during impacts. Passenger seats, such as aircraft seats, may use a seatbelt to reduce the amount of forward excursion of an occupant during an impact. For example, use of a Y-belt may provide a more direct transfer of loads through the seatbelt. A traditional seatbelt generally includes two attachment points where the seatbelt attaches to the seat structure, one on each side of the occupant. A Y-belt includes an additional attachment point on each side of the occupant, resulting in two attachment points where the seatbelt attaches to the seat on each side of the occupant. The additional attachment points on a Y-belt are generally located higher than the standard seat belt attachment points. These additional attachment points can create a more direct path for the load to be transferred to the seat structure and can reduce the forward excursion of an occupant during an impact, such as during a crash scenario.

Current y-belt designs use fixed attachment points that cannot be changed or adjusted once a seat has been designed and certified. Often, these fixed attachment points are designed to accommodate a $50^{th}$ percentile male passenger. However, when a child or a $5^{th}$ percentile female passenger occupies the seat, the lower belt portion slacks, creating an increased amount of tension in the top portion of the seat belt and increasing the load applied to the abdomen soft tissues, therefore reducing safety.

BRIEF DESCRIPTION OF THE DRAWINGS

The specification makes reference to the following appended figures, in which use of like reference numerals in different figures is intended to illustrate like or analogous components

DETAILED DESCRIPTION

The subject matter of embodiments of the present disclosure is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Certain aspects and features of the present disclosure relate to a safety belt (e.g., a seat belt) secured to a structure (e.g., a seat structure) using translatable anchor points. In an embodiment, the safety belt is attached to anchor plates at anchor points. The anchor plates are pivotally attached to a seat structure, allowing the plates to pivot when a load is applied to the safety belt, thus allowing the anchor points to self-align to maintain an equal amount of tension across the lower and higher portion of the seat belt. In a different embodiment, the safety belt is attached to anchors that slidably move up within channels in response to load applied to the safety belt, allowing the anchor points to self-align to maintain proper tension and positioning of the safety belt. While described herein as being used with safety belts, such as safety belts on airplane passenger seats, the embodiments disclosed herein can be used with other restraints such as harnesses and can be used on other structures, such as car seats, roller-coaster rides, or other structures necessitating restraints.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may be drawn not to scale.

Figure 1:
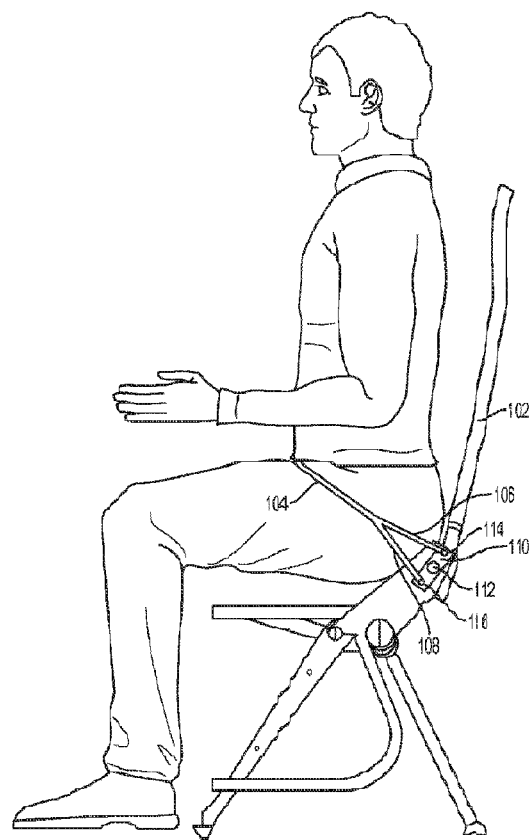
FIG. 1 is a graphical depiction of an average occupant in a seat structure according to one embodiment.

FIG. 1 is a graphical depiction of an average occupant in a seat structure 102 according to one embodiment. The seat structure 102 can include an anchor plate 110 to which a safety belt 104 is attached. The safety belt 104 can be a y-belt, having a left side and a right side. As seen in FIG. 1, the left side is shown. The right side may be identical or similar to the left side. The left side will be described in general terms below. It will be understood that the right side may be identical and/or mirrored to the left side.

The safety belt 104 can include a first attachment 106 and a second attachment 108. Each of the first attachment 106 and second attachment 108 attach to an anchor plate 110. The first attachment 106 attaches at a first anchor point 114 and the second attachment 108 attaches at the second anchor point 116. The anchor plate 110 is attached to the seat structure 102 at a pivot location 112. The anchor plate 110 is able to pivot about the pivot location 112. Stops may be included on the anchor plate 110 or the seat structure 102 to ensure the anchor plate 110 is only able to pivot by a fixed number of degrees. The anchor plate 110 may be attached to a spreader of a seat structure 102.

In some embodiments, the first anchor point 114 and the second anchor point 116 are equidistant from the pivot location 112. As used herein, the term "anchor point" refers to the general location of where a safety belt attachment attaches to another structure. A safety belt attachment may be attached at an anchor point in any suitable way, including through the use of a bracket, a stitched loop, or any other suitable attachment mechanism.

When an average occupant sits in the seat structure 102 and buckles the safety belt 104, the anchor plate 110 will pivot until tension is applied generally evenly along the first attachment 106 and second attachment 108.

Figure 2:
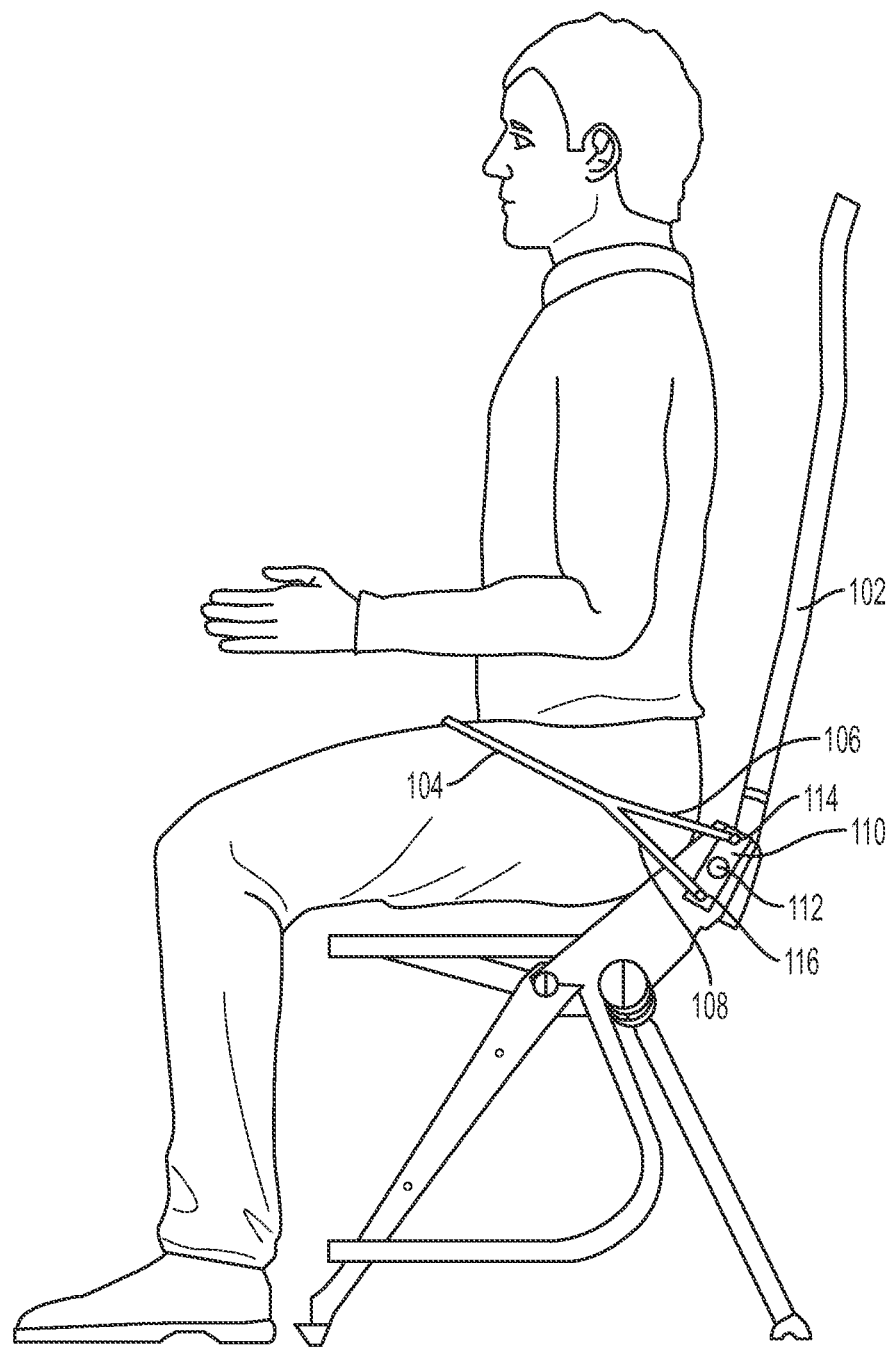
FIG. 2 is a graphical depiction of a child occupant in the seat structure of FIG. 1 according to one embodiment.

FIG. 2 is a graphical depiction of a child occupant in the seat structure 102 of FIG. 1 according to one embodiment. When a non-average occupant sits in the seat structure 102, such as a child occupant as seen in FIG. 2, the anchor plate 110 will pivot until tension is applied generally evenly along the first attachment 106 and second attachment 108. In the case of a smaller-than-average occupant, the anchor plate 110 will pivot counter-clockwise, as seen in FIG. 2, such that the safety belt 104 will lie at a shallower angle, positioned properly across the smaller occupant's lap.

When a larger-than-average occupant (not shown) sits in the seat structure 102, the anchor plate 110 will pivot clockwise, as seen in FIG. 2, such that the safety belt 104 will lie at a steeper angle, positioned properly across the larger-than-average occupant.

In some embodiments, the anchor plate 110 can be biased to a first position using a biasing device. Any suitable biasing device can be used, such as springs, magnets, or other suitable biasing devices. The first position can be a position where the anchor plate 110 is pivoted generally counter-clockwise, such as the position seen in FIG. 2, or pivoted further counter-clockwise from the position seen in FIG. 2. In this first position, the safety belt 104 will properly lie across the laps of small occupants. When a larger occupant uses the safety belt 104, the anchor plate 110 will pivot clockwise, against the biasing force of the biasing device, until it reaches the proper position. The biasing device can provide a relatively low biasing force.

In some embodiments, the anchor plate 110 is coupled to the seat structure 102 pivotally with sufficient friction to prevent rattling. Friction can be provided in any suitable way, including wearable features (e.g., rubber glides) or close-fitting parts.

Figure 3:
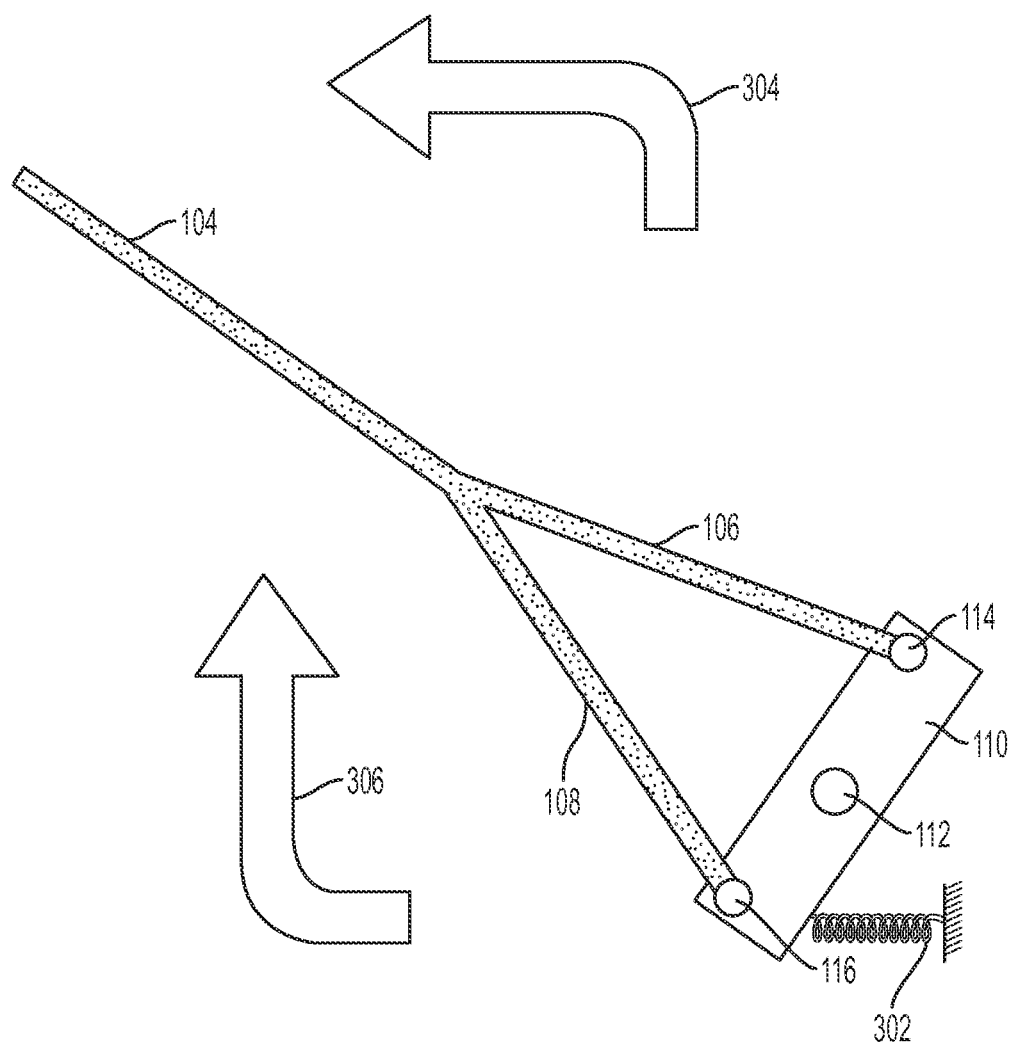
FIG. 3 is a schematic depiction of the left side of a safety belt of FIG. 1 according to one embodiment.

FIG. 3 is a schematic depiction of the left side of a safety belt 104 of FIG. 1 according to one embodiment. The safety belt 104 includes the first attachment 106 and the second attachment 108. The first attachment connects to the anchor plate 110 at the first anchor point 114 and the second attachment connects to the anchor plate 110 at the second anchor point 116. First anchor point 114 and second anchor point 116 are shown schematically, but may in fact be comprised of additional parts and pieces, including brackets, bolts, nuts, and other suitable fastening devices for securing the safety belt attachments 106, 108 to the anchor plate 110 at the anchor points 114, 116.

The anchor plate 110 pivots around pivot location 112. The anchor plate 110 can pivot to a steeper angle by pivoting in direction 306. The anchor plate 110 can pivot to a shallower angle by pivoting in direction 304. As described above, shallower angles may be best suited for smaller occupants, while steeper angles may be best suited for larger occupants.

A biasing device 302 can be used to bias the anchor plate 110 towards a desired position. The desired position may be at an end point of rotational travel of the anchor plate 110, or may be a position before the end point of rotational travel of the anchor plate 110. The biasing device 302 can bias the anchor plate 110 towards a shallow angle suitable for a smaller-than-average occupant.

Figure 4:
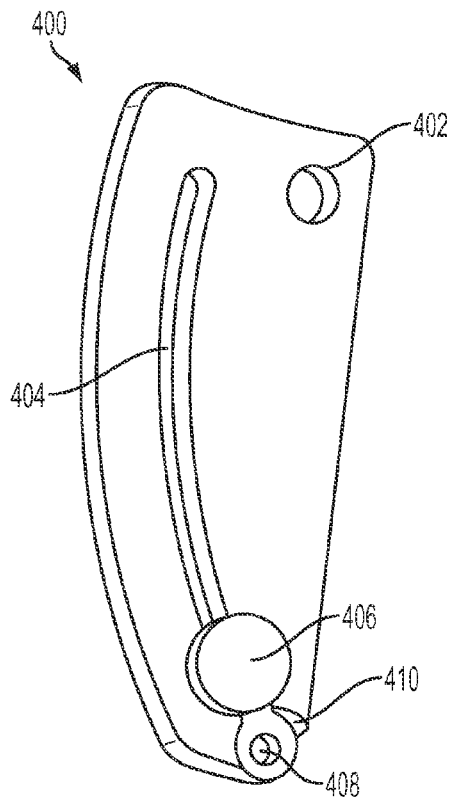
FIG. 4 is an axonometric projection of an anchor plate of a different embodiment.

FIG. 4 is an axonometric projection of an anchor plate 400 according to a different embodiment. The anchor plate 400 includes a first attachment hole 402 and a second attachment hole 408 for securing the anchor plate 400 to a seat structure. The anchor plate includes a channel 404 within which a slidable anchor 406 can slide. The slidable anchor 406 can be introduced into the channel 404 at a channel opening 410. A suitable fastener or securing device can be placed through the second attachment hole 408 to secure the slidable anchor 406 in the channel 404.

In some embodiments, the slidable anchor 406 can be attached to a compressible spring or biasing device, such as one that sits inside channel 404. The spring or biasing device can be positioned to resist upward movement of the slidable anchor 406. When the slidable anchor 406 is forced up the channel 404 by load on the safety belt, the spring or biasing device can resist the upward motion of the slidable anchor 406. The stiffness (K value) of the spring or biasing device can be controlled to provide adjustment to the biasing force. A controlled motion can be achieved by using a biasing device or spring.

The slidable anchor 406 serves as an anchor point for an attachment of a safety belt. A seat structure can include a left and right anchor plate so that each end of the safety belt can attach to its own anchor plate 400. The anchor plate 400 can be used with a 2-point lap belt with two attachments (e.g., a left attachment and a right attachment). In some embodiments, a safety belt with more than two attachments (e.g., a y-belt) can be used with the anchor plate 400 and slidable anchor 406.

The channel 404 can be shaped such that when load is applied to the safety belt, such as during a crash scenario, the slidable anchor 406 will slide up to a desired position. In some embodiments, the channel 404 is arcuate in shape. As used herein, the term "up" refers generally to the direction extending from the bottom of the seat structure to the top of the seat structure, regardless of orientation of the seat structure.

In a crash scenario, the slidable anchor 406 can slide to a desired position based on the size of the occupant. A larger-than-average occupant may cause the slidable anchor 406 to slide relatively higher within the channel 404 due to the need of a steeper angle of the safety belt. A smaller-than-average occupant may cause the slidable anchor 406 to slide not as high as a larger-than-average occupant due to the need for a shallower angle of the safety belt.

In some embodiments, a biasing device can urge the slidable anchor 406 towards a desired position, such as a position at the bottom of the channel 404.

Figure 5:
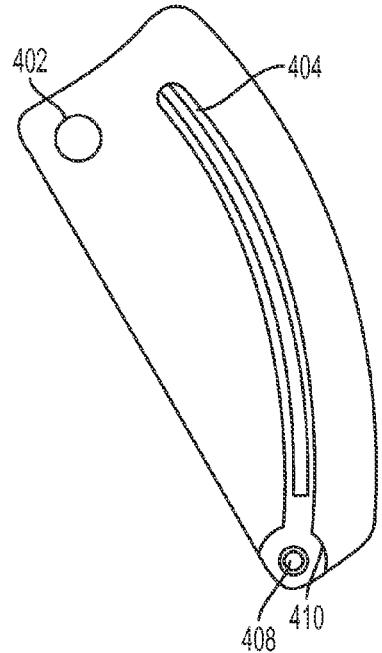
FIG. 5 is an axonometric projection of the anchor plate of FIG. 4 according to one embodiment.

FIG. 5 is an axonometric projection of the anchor plate 400 of FIG. 4 according to one embodiment. The anchor plate 400 with the first attachment hole 402 and second attachment hole 408 are depicted without the slidable anchor 406. The slidable anchor 406 can slide into the channel 404 through the channel opening 410.

Figure 6:
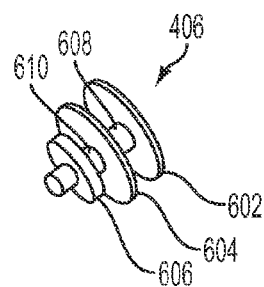
FIG. 6 is an axonometric projection of a slidable anchor according to one embodiment.

FIG. 6 is an axonometric projection of a slidable anchor 406 according to one embodiment. The slidable anchor 406 includes a first recess 610 and a second recess 608 defined by an inner wall 606, a middle wall 604, and an outer wall 602. The first recess 610 fits into the channel 404, allowing the slidable anchor 406 to slide within the channel 404. The second recess 608 allows a safety belt to be attached thereto. A safety belt can be attached directly to the second recess 608 or can attach to the second recess 608 with an attachment device such as a bracket or other suitable device.

In some embodiments, the slidable anchor 406 can take other shapes and may include other features, such as attachment points for biasing devices or actuators.

Figure 7:
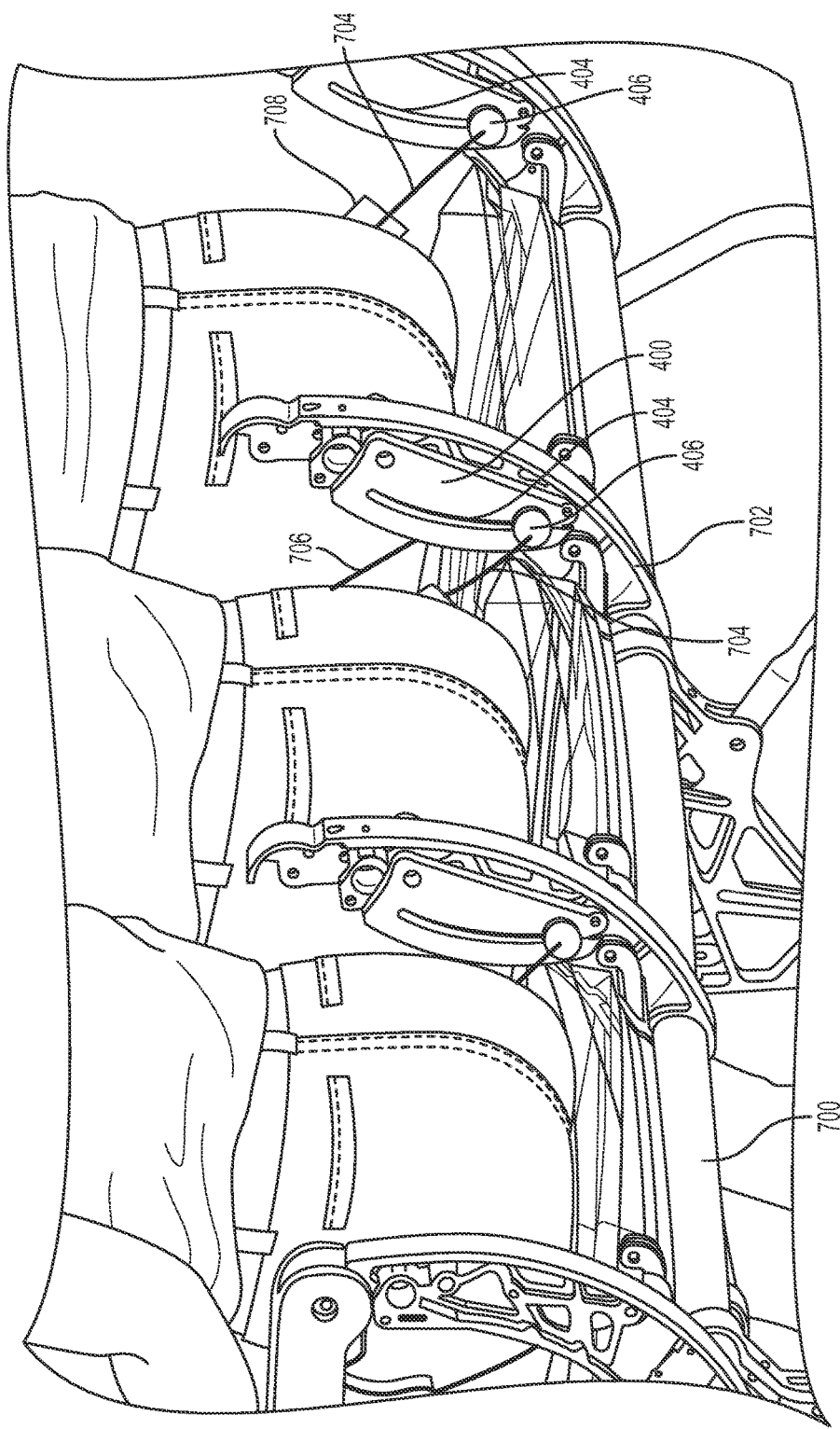
FIG. 7 is a graphical depiction of a seat structure supporting several occupants in a pre-crash orientation according to one embodiment.

FIG. 7 is a graphical depiction of a seat structure 700 supporting several occupants in a pre-crash orientation according to one embodiment. Multiple anchor plates 400 having channels 404 are secured to the seat structure 700. One anchor plate 400 is located on each side of an occupant. A safety belt 708 (represented in FIG. 7 as a thin line) is secured around each occupant. Each safety belt 708 includes a left attachment 706 and a right attachment 704. Each attachment 704, 706 is secured to a slidable anchor 406. The slidable anchor 406 serves as the movable anchor point.

In a pre-crash orientation, occupants are sitting normally and the anchor points (e.g., the anchors 406) are located near the bottom of the channels 404 of the anchor plates 400. In some embodiments, a biasing device urges the slidable anchors 406 to the bottom of the channels 404.

Figure 8:
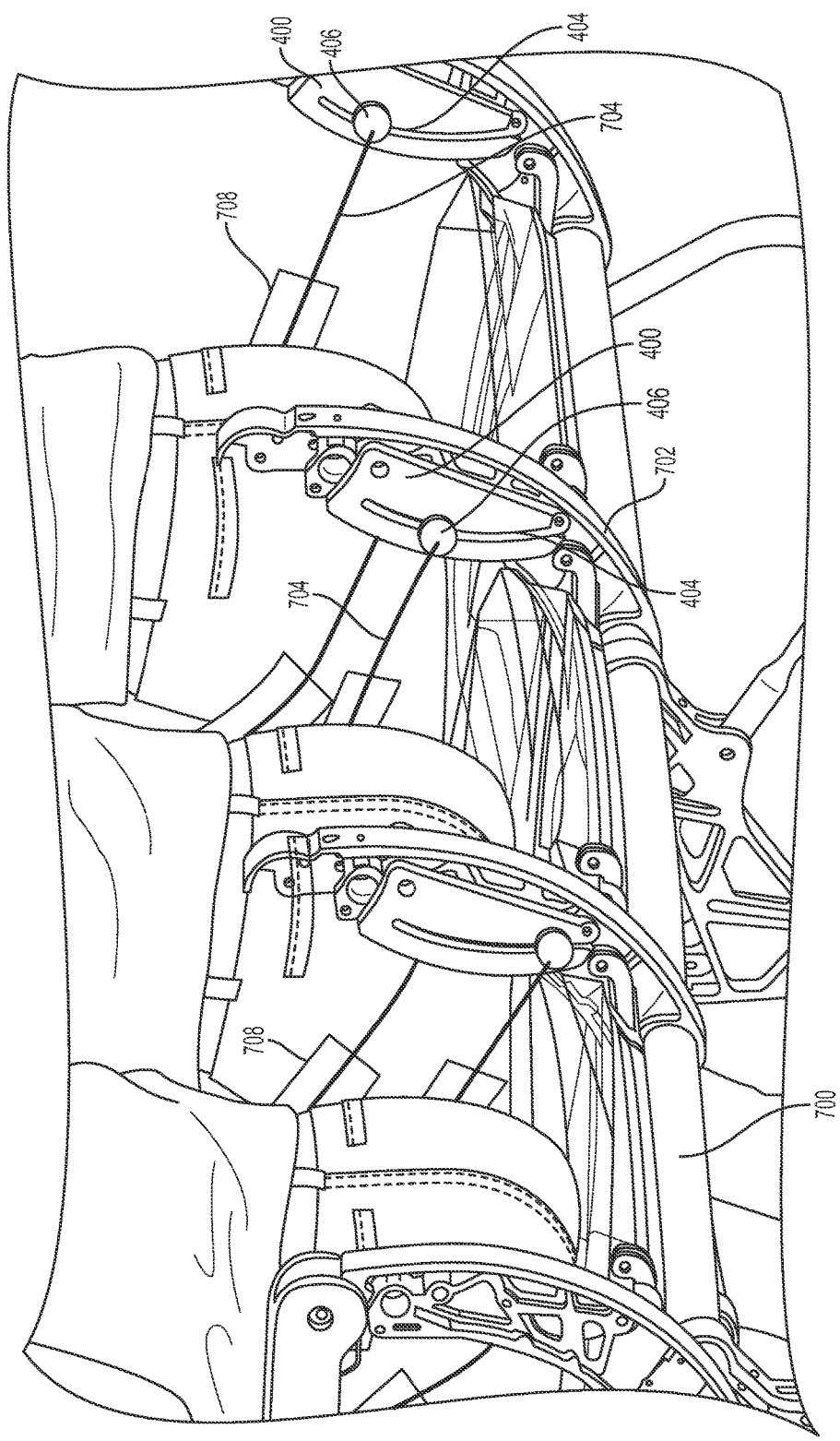
FIG. 8 is a graphical depiction of the seat structure of FIG. 7 during an early load initiation during the crash event according to one embodiment.

FIG. 8 is a graphical depiction of the seat structure 700 of FIG. 7 during an early load initiation during the crash event according to one embodiment. In the early load initiation during the crash event, the occupants are being thrown forward due to the inertial effects that are transferred to them, thus putting load on the safety belts 708. As load is put on the safety belts 708, the anchor points (e.g., slidable anchors 406) will slide up the channels 404. The amount the slidable anchors 406 will slide up the channels 404 depends in part on the size of the occupant. A larger-than-average occupant may cause the slidable anchors 406 to slide further up the channels 404 than would a smaller-than-average occupant. In some embodiments, the amount the slidable anchor 406 slides up the channel 404 can depend on the stiffness of a spring or other biasing device positioned to provide resistance to sliding up the channel 404.

Figure 9:
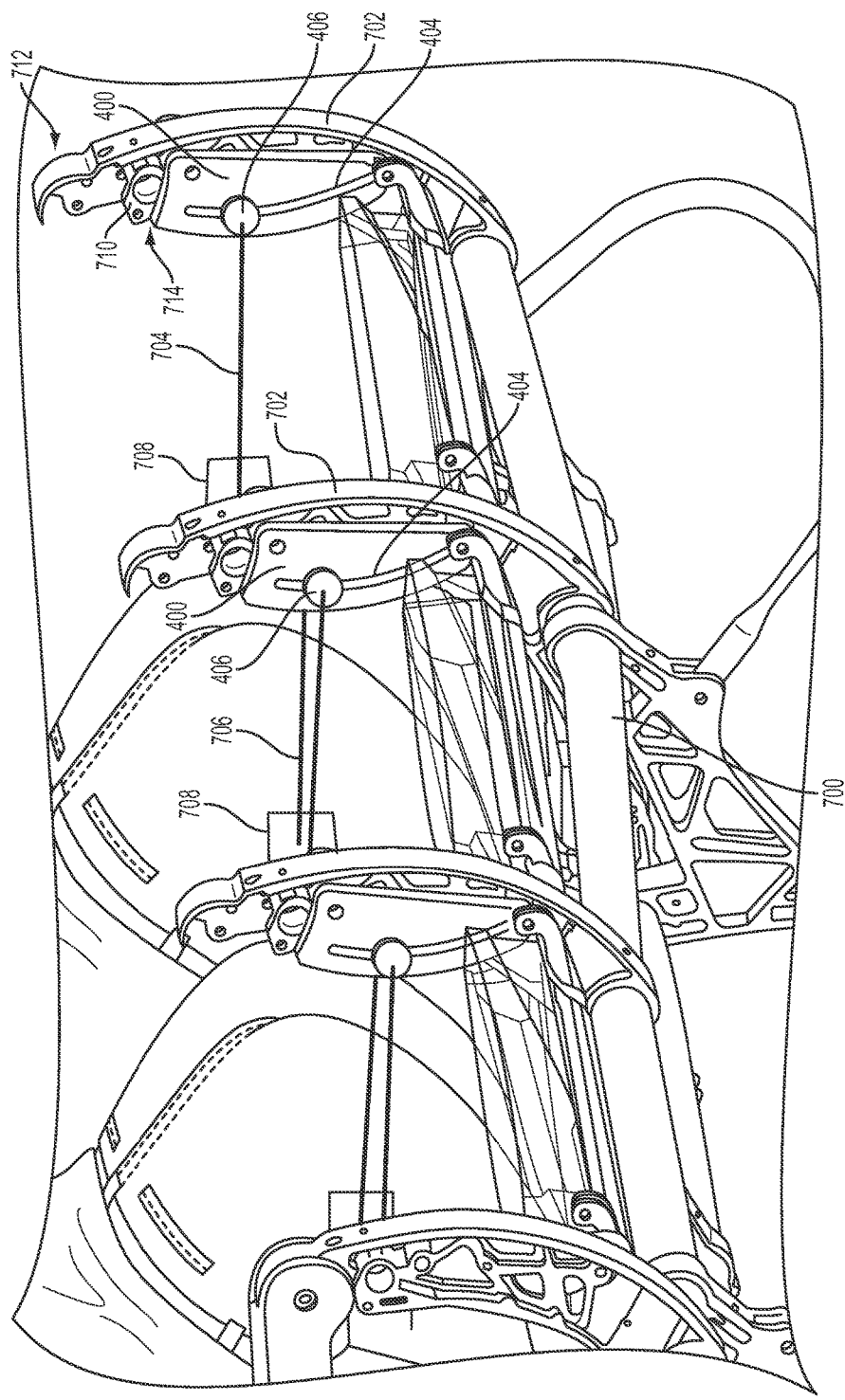
FIG. 9 is a graphical depiction of the seat structure of FIG. 7 during a complete load transfer from the occupant to the safety belt during a crash event according to one embodiment.

FIG. 9 is a graphical depiction of the seat structure 700 of FIG. 7 during a complete load transfer from the occupant to the safety belt during a crash event according to one embodiment. In the complete load transfer, each slidable anchor 406 has slid further up (e.g., to a second position). This position may be different for each occupant, depending on the size of the occupant, and provides a desirable positioning of the safety belt 708 around the occupant (e.g., not pushing the safety belt into soft tissue of the occupant, but rather onto bone). The shape of the channels 404 can be formed to provide optimal positioning of the slidable anchors 406 during a crash event. During a crash event, the safety belt 708 can move up the pelvic area of an occupant to reduce tissue damage of the occupant's abdominal area, hence providing a safe, secure restrain to the occupant.

In some embodiments, the channel 404 is located directly on the seat structure 700 itself, such as on spreader 702. For example, the channel 404 can be located on a left face 710 or right face 712 of the spreader 702, or on a front face 714. The channel 404 can take various forms and shapes that are able to retain the slidable anchor 406 and allow it to move with respect to the seat structure 700.

In some embodiments, an actuator, such as an actuated piston, can provide force to the anchor point (e.g., via providing force to an anchor plate 110 or a slidable anchor 406) to move the anchor point to a desired position during a crash scenario. Such an actuator can be a hydraulic actuator, a linear actuator, a spring, or any other suitable mechanism for forcing the anchor point to a desired position. In some embodiments, such an actuator can be triggered by a crash detector. In some embodiments, such an actuator can force an anchor point to one or more desired positions within certain timeframes after a crash is detected. For example, an actuator can be used to force an anchor point to a first desired position a first amount of time after a crash, then force the anchor point to a second desired position a second amount of time after a crash. In some embodiments, the actuator can be controllable (e.g., a hydraulic actuator that can force the anchor point to particular locations as directed by a computer). In some embodiments, the actuator can be non-controllable (e.g., a spring that forces a slidable anchor 406 to the top of a channel 404 upon detection of a crash).

The use of a movable anchor point, as described in various embodiments above, can be used to adjust the positioning of a safety belt on an occupant before and during a crash scenario. Additionally, use of a movable anchor point can allow the headpath of an occupant during a crash scenario to be limited, which can be useful to keep an occupant from striking a monument, obstacle, or other seat in front of the occupant during a crash scenario.

In some embodiments, use of a movable anchor point can reduce the amount of displacement that occurs on an occupant's head during a crash scenario, thus increasing overall safety.

In some embodiments, use of a movable anchor point decreases the moment arm of the load applied to the seat structure through the safety belt. This decrease can allow the seat structure to receive less loading during a crash event as compared to a full Y-belt. Therefore, seat structure design can be altered, as less structural support may be needed than if a movable anchor point was not used. Seat structures used with movable anchor points may be made of more inexpensive materials, lighter materials, or otherwise desirable designs without a decrease in structural integrity.

Use of a movable anchor point, especially in a slidable anchor embodiment, may allow for increased safety without the need for a y-belt. It can be desirable to not use a y-belt because of cost to manufacture, materials used, weight, and the otherwise common availability of 2-point safety belts. Additionally, it can be desirable to not use a y-belt because the y-belt design limits how far the safety belt can be tightened, such as on a small child.

Different arrangements of the components depicted in the drawings or described above, as well as components and steps not shown or described are possible. Similarly, some features and sub-combinations are useful and may be employed without reference to other features and sub-combinations. Embodiments of the disclosure have been described for illustrative and not restrictive purposes, and alternative embodiments will become apparent to readers of this patent. Accordingly, the present disclosure is not limited to the embodiments described above or depicted in the drawings, and various embodiments and modifications may be made without departing from the scope of the claims below.

What is claimed is:

1. A vehicle safety restraint system, comprising:
   a Y-belt safety belt having first and second left attachments and first and second right attachments, the first and second left attachments coupled to a seat structure via first and second left anchor points located on a left anchor plate pivotally attached to the seat structure at a left pivot location offset from the first left anchor point, the first left anchor point translatable with respect to the seat structure in response to load applied to the safety belt, and the first and second right attachments coupled to the seat structure via first and second right anchor points located on a right anchor plate pivotally attached to the seat structure at a right pivot location offset from the first right anchor point, the first right anchor point translatable with respect to the seat structure in response to the load applied to the safety belt.

2. The system of claim 1, further comprising:
a left biasing device coupled to the first left anchor point operable to bias the first left anchor point to a first left position; and
a right biasing device coupled to the first right anchor point operable to bias the first right anchor point to a first right position.

3. A safety belt anchoring system, comprising:
an anchor point for accepting an attachment point of a Y-belt safety belt, the anchor point movably coupled to a seat structure and located on an anchor plate pivotally attached to the seat structure at a pivot location offset from the anchor point, wherein the anchor point is movable between a first position and a second position, and wherein the anchor point is movable in response to load applied to the safety belt; and
an additional anchor point for accepting a second attachment point of the safety belt, the additional anchor point located on the anchor plate.

4. The system of claim 3, further comprising a biasing device coupled to the anchor point operable to bias the anchor point to the first position.

5. A method, comprising:
securing a Y-belt safety belt to a seat structure at first and second left anchor points located on a left anchor plate pivotally attached to the seat structure at a left pivot location offset from the first left anchor point and first and second right anchor points located on a right anchor plate pivotally attached to the seat structure at a right pivot location offset from the first right anchor point;
applying a load to the safety belt;
translating the left anchor point and the right anchor point in response to applying the load to the safety belt, wherein translating the left anchor point and the right anchor point further includes pivoting the left anchor plate and the right anchor plate about the left pivot location and the right pivot location, respectively, in response to applying the load to the safety belt; and
translating the second left anchor point and the second right anchor point in response to applying the load to the safety belt.

6. The method of claim 5, further comprising biasing the first left anchor point towards a first left position and biasing the first right anchor point towards a first right position.

7. A vehicle safety restraint system, comprising:
a safety belt having a left attachment and a right attachment, the left attachment coupled to a seat structure via a left anchor point slidably located within a left anchor channel and translatable with respect to the seat structure in response to load applied to the safety belt, and the right attachment coupled to the seat structure via a right anchor point slidably located within a right anchor channel and translatable with respect to the seat structure in response to the load applied to the safety belt.

8. The system of claim 7, further comprising:
a left biasing device coupled to the left anchor point operable to bias the left anchor point to a first left position; and
a right biasing device coupled to the right anchor point operable to bias the right anchor point to a first right position.

9. The system of claim 7, wherein:
the left anchor channel of the left anchor point is a left anchor channel of a left anchor plate couplable to the seat structure; and
the right anchor channel of the right anchor point is a right anchor channel a right anchor plate couplable to the seat structure.

10. The system of claim 7, wherein:
the left anchor channel of the left anchor point is a left anchor channel of the seat structure; and
the right anchor channel of the right anchor point is a right anchor channel of the seat structure.

11. A safety belt anchoring system, comprising:
an anchor point for accepting an attachment point of a safety belt, the anchor point movably coupled to a seat structure and slidably located within an anchor channel, wherein the anchor point is movable between a first position and a second position, and wherein the anchor point is movable in response to load applied to the safety belt.

12. The system of claim 11, further comprising a biasing device coupled to the anchor point operable to bias the anchor point to the first position.

13. The system of claim 11, wherein the anchor channel of the anchor point is an anchor channel of an anchor plate couplable to the seat structure.

14. The system of claim 11, wherein the anchor channel of the anchor point is an anchor channel of the seat structure.

15. A method, comprising:
securing a safety belt to a seat structure at a left anchor point and a right anchor point;
applying a load to the safety belt; and
translating the left anchor point and the right anchor point in response to applying the load to the safety belt, wherein translating the left anchor point and the right anchor point includes sliding the left anchor point within a left anchor channel and sliding the right anchor point within a right anchor channel.

16. The method of claim 15, further comprising biasing the left anchor point towards a first left position and biasing the right anchor point towards a first right position.

17. The method of claim 15, wherein sliding the left anchor point within the left anchor channel includes sliding the left anchor point within a left channel of a left anchor plate, and wherein sliding the right anchor point within the right anchor channel includes sliding the right anchor point within a right channel of a right anchor plate.

18. The method of claim 15, wherein sliding the left anchor point within the left anchor channel includes sliding the left anchor point within a left channel of the seat structure, and wherein sliding the right anchor point within the right anchor channel includes sliding the right anchor point within a right channel of the seat structure.

* * * * *